(12) United States Patent  
Nakagawa et al.

(10) Patent No.: US 8,273,281 B2  
(45) Date of Patent: *Sep. 25, 2012

(54) GOLF BALL MOLD, GOLF BALL AND GOLF BALL MANUFACTURING METHOD

(75) Inventors: Takuma Nakagawa, Saitama-ken (JP); Katsunori Sato, Saitama-ken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 12/796,976

(22) Filed: Jun. 9, 2010

(65) Prior Publication Data

US 2011/0160002 A1 Jun. 30, 2011

Related U.S. Application Data

(63) Continuation-in-part of application No. 12/648,513, filed on Dec. 29, 2009.

(51) Int. Cl.  
  *B29C 45/14* (2006.01)  
  *B29C 70/70* (2006.01)  
(52) U.S. Cl. ............ 264/279.1; 425/116; 425/129.1  
(58) Field of Classification Search ............ 425/116, 425/129.1; 264/279.1; 473/373, 378, 383  
See application file for complete search history.

(56) References Cited

U.S. PATENT DOCUMENTS

| | | | | |
|---|---|---|---|---|
| 5,827,038 A | * | 10/1998 | Barden | 414/725 |
| 5,874,038 A | * | 2/1999 | Kasashima et al. | 264/279 |
| 6,123,534 A | | 9/2000 | Kasashima et al. | |
| 6,632,078 B2 | | 10/2003 | Ogg et al. | |
| 6,685,456 B2 | | 2/2004 | Sajima | |
| 7,150,618 B2 | | 12/2006 | Sajima et al. | |
| 7,618,333 B2 | | 11/2009 | Nardacci et al. | |
| 2007/0232411 A1 | | 10/2007 | Inoue et al. | |
| 2011/0159989 A1 | * | 6/2011 | Nakagawa et al. | 473/351 |

FOREIGN PATENT DOCUMENTS

| | | | |
|---|---|---|---|
| JP | 6-143349 A | | 5/1994 |
| JP | 08034036 A | * | 2/1996 |
| JP | 8-173576 A | | 7/1996 |
| JP | 10-127826 A | | 5/1998 |
| JP | 11-70186 A | | 3/1999 |
| JP | 11-137727 A | | 5/1999 |
| JP | 2000-42143 A | | 2/2000 |
| JP | 2001-170217 A | | 6/2001 |
| JP | 2001-187172 A | | 7/2001 |

(Continued)

*Primary Examiner* — Robert B Davis  
(74) *Attorney, Agent, or Firm* — Sughrue Mion, PLLC

(57) ABSTRACT

A golf ball mold that is provided that has of a plurality of mold parts which removably mate to form a cavity having an inner wall with a plurality of dimple-forming protrusions thereon, wherein a non-circular resin injection port for injecting into the cavity a resin material is formed between a plurality of mutually adjoining dimple-forming protrusions which include a plurality of dimple-forming protrusions that lie across a parting line of the mold. By using the golf ball mold of the invention, even when manufacturing golf balls with a high dimple surface coverage on which the dimples are tightly arranged, particularly up to the vicinity of the resin injection port, imbalances in the resin injection pressure and flow rate during injection molding are suppressed, enabling golf balls to be manufactured without giving rise to production problems such as molding defects, scorching, or deformation and eccentricity of the core.

10 Claims, 11 Drawing Sheets

FOREIGN PATENT DOCUMENTS

| | | |
|---|---|---|
| JP | 2002-159598 A | 6/2002 |
| JP | 2004-89549 A | 3/2004 |
| JP | 2006-212057 A | 8/2006 |
| JP | 2007-136182 A | 6/2007 |
| JP | 2007-159715 A | 6/2007 |
| JP | 2007-268265 A | 10/2007 |

* cited by examiner

GOLF BALL MOLD, GOLF BALL AND GOLF BALL MANUFACTURING METHOD

CROSS-REFERENCE TO RELATED APPLICATION

This application is a continuation-in-part of copending application Ser. No. 12/648,513 filed on Dec. 29, 2009, the entire contents of which are hereby incorporated by reference.

BACKGROUND OF THE INVENTION

The present invention relates to a golf ball mold suitable for molding solid golf balls composed of a core encased by one or more cover layer, and thread-wound golf balls. The invention relates also to golf balls molded using such a mold, and to a method of manufacturing golf balls using such a mold.

Molds for molding golf balls are generally composed of a plurality of parts which removably mate to each other; a golf ball is manufactured by feeding a golf ball molding material to a cavity that forms at the interior of the mold when these mold parts are mated. From the standpoint of ease of mold fabrication and ball moldability, etc., the parting plane of the mold parts is often rectilinear in shape without concavities and convexities. A parting plane having such a rectilinear shape is often coincident with the equator of the golf ball. Thus, in golf balls molded with such a mold, dimples are not formed on the equator which corresponds to the parting plane; instead, a somewhat wide great circle is formed at the equator.

However, in a golf ball having at the equator a wide great circle with no dimples lying thereacross, it is difficult to achieve a uniform arrangement of dimples on the spherical surface of the ball. This leads to a lack of uniformity in the aerodynamic symmetry of the ball, giving rise to a variability in the flight performance depending on where the ball is hit.

Hence, to eliminate a wide great circle on the equator, attempts are being made to form dimples that lie across the equator. For example, JP-A 10-127826 discloses a golf ball mold 10 having a construction wherein, as shown in FIG. 8, an upper mold half 10a and a lower mold half 10b removably mate to form at the interior a hollow spherical cavity c having an inner wall with numerous dimple-forming protrusions 40 thereon. In addition, the parting planes 30 on the upper and lower mold halves are formed in concavo-convex shapes, and dimple-forming protrusions 40 are situated so as to lie across the parting line PL at the concavo-convexly shaped areas. In this mold 10, to form dimples which lie across the parting line PL, cylindrical pins (convex features) 30a having dimple-shaped ends are provided on the parting plane 30 of the lower mold half 10b and circular holes (concave features) 30b corresponding to the cylindrical pins (convex features) 30a are formed on the parting plane 30 of the upper mold half 10a so that these fit together when the upper and lower mold halves are mated. Also shown in the diagram is a resin injection port 20.

In addition to the foregoing, numerous disclosures have been made wherein, to have dimples lie across the golf ball equator, the parting plane of the mold is given a shape that is concavo-convex rather than rectilinear, with portions of, or entire, dimple-forming protrusions being disposed on the convex portions thereof (e.g., JP-A 06-143349, JP-A 08-173576, JP-A 11-070186, JP-A 11-137727, JP-A 2001-170217, JP-A 2001-187172, JP-A 2002-159598, JP-A 2004-089549, JP-A 2006-212057, JP-A 2007-136182, JP-A 2007-159715 and JP-A 2007-268265).

At the same time, in terms of the aerodynamic properties of a golf ball, it is desirable to provide dimples on a greater portion of the golf ball surface, such advantageous effects being known to increase as the total surface area of the dimples as a proportion of the golf ball surface area (surface area coverage) approaches 100%. Hence, to improve the symmetry of the aerodynamic properties in this way and achieve an even further increase in performance, bringing the dimple surface coverage close to 100% is important.

In this type of mold, resin injection ports (also referred to below simply as "injection ports") for introducing resin into the cavity are normally provided along the parting plane. However, circular injection ports having a specific opening surface area in order to keep imbalances in the injection pressure and resin flow rate from arising are generally formed at sizes and positions which do not overlap with the dimple-forming protrusions (on the molded ball surface, at positions which correspond to lands where dimples are not formed). For example, JP-A 2000-42143 mentions providing circular injection ports having a diameter of about 0.5 to about 1.0 mm. However, the intervals between the dimples become smaller as the dimples are arranged more densely so as to bring the dimple surface coverage closer to 100%; as a result, the surface area available for providing injection ports decreases. This problem is commonly addressed by reducing the diameter of the injection ports, but imbalances in the resin injection pressure and flow rate often arise as a result. Hence, when a cover is formed over a core or a sphere composed of a core encased by another layer such as an intermediate layer, the core may end up deformed or the position of the core within the mold may end up off-center, leading to various problems, such as molding defects, scorching or eccentricity. Golf balls with these problems have an inferior quality, such as durability, symmetry and appearance. Also, as shown in FIG. 9, by adjusting the sizes of the dimple-forming protrusions 40 and making the interval between those dimple-forming protrusions 40 which adjoin the injection port 20 larger, it is possible to secure the surface area of the opening in the injection port 20, although further increase in the uniformity of the aerodynamic properties or the surface coverage is difficult.

Thus, various innovations have hitherto been made to increase the dimple surface coverage and thereby enhance the aerodynamic properties of the ball. However, a fundamental solution to the conflicting problems of mold design and dimple design has yet to be achieved. Accordingly, an approach that resolves the above problems has been sought, both in order to further enhance the aerodynamic properties of the golf ball and also to improve the degree of freedom in mold design.

Also, in the prior art, because the basic shape of an injection port is circular, it is difficult to efficiently cool the entire gate area for which the injection port serves as the opening; excessive time has thus been required to cool gate areas. Molding defects sometimes arise at the ball surface near the gates, particularly in cases where a resin material of relatively low hardness is molded. That is, after the resin material has been injection-molded, even when an effort is made to cool the entire gate area, cooling of the resin material within the gate near the center axis thereof is inadequate. As a result, after the resin material within the gate has been cooled and solidified, a gate mark ends up remaining on the surface of the finished ball obtained by parting the top and bottom mold halves, removing the molded ball, and subjecting it to gate cutting treatment, trimming and painting. Such gate marks are conspicuous and detract from the appearance of the ball.

Examples of prior art directed at injection gates having an injection port in a golf ball mold include JP-A 2000-185117, JP-A 2000-185116, JP-A 09-313647 and JP-A 08-034036.

SUMMARY OF THE INVENTION

It is therefore an object of the present invention to provide a golf ball mold which makes it easy to increase the dimple surface coverage, enables an injection port having an opening with a specific surface area to be provided even when the dimples are densely formed, and enables stable molding to be carried out without giving rise to the above-described production problems. Further objects of the invention are to provide a golf ball molded using such a mold and a method of manufacturing golf balls using such a mold.

Additional objects of the present invention are to provide a golf ball mold in which resin material within the gates sufficiently cools and solidifies, giving a molded ball having a good appearance without conspicuous gate marks, thereby greatly reducing the incidence of appearance defects during production and making it possible to enhance productivity; a golf ball molded using such a mold; and a method of manufacturing golf balls using such a mold. Still further objects of the invention are to provide a golf ball mold which enhances productivity without giving rise to molding defects when a resin material of relatively low hardness is injection molded; a golf ball molded using such a mold; and a method of manufacturing golf balls using such a mold.

To achieve the above object, the invention provides the following golf ball mold, golf ball manufacturing method and golf ball.

[1] A golf ball mold comprising a plurality of mold parts which removably mate to form a cavity having an inner wall with a plurality of dimple-forming protrusions thereon, wherein a non-circular resin injection port for injecting into the cavity a resin material is formed between a plurality of mutually adjoining dimple-forming protrusions which include a plurality of dimple-forming protrusions that lie across a parting line of the mold and, when equally spaced lines are drawn at 0.05 mm intervals from an inner peripheral wall toward a center axis of a gate having the resin injection port, the cross-sectional size of the gate is adjusted so that the distance between the center of a region enclosed by the innermost equally spaced line and the inner peripheral wall of the gate is less than 0.5 mm.

[2] The golf ball mold of [1], wherein the non-circular resin injection port is provided so as to intersect the parting line.

[3] The golf ball mold of [1], wherein the non-circular resin injection port has an opening with a surface area of from about 0.2 to about 2.5 mm$^2$.

[4] The golf ball mold of [1], wherein the resin injection port has a shape which is formed with rotational symmetry and which has a center of symmetry that lies on the parting line.

[5] The golf ball mold of [1], wherein the resin injection port has an aspect ratio (width/height) of from about 1.0 to about 8.0.

[6] The golf ball mold of [1], wherein the dimple-forming protrusions have shapes that are free of straight lines.

[7] The golf ball mold of [1], wherein the resin material that is injected has a Shore D hardness of from 40 to 53.

[8] A golf ball which is molded using the golf ball mold of [1].

[9] A method of manufacturing golf balls, comprising the steps of molding a golf ball using the golf ball mold of [1], then trimming flash that has formed on a surface of the golf ball.

In the golf ball mold of the present invention, by forming a non-circular resin injection port between a plurality of mutually adjoining dimple-forming protrusions which include dimple-forming protrusions that lie across a parting line of the mold, the shape of the injection port is not limited to the circular or oval shapes of conventional injection ports, thus making it possible to ensure that the injection port has at least a given cross-sectional surface area even when the interval between the adjoining dimples has been made smaller than in the prior art. Therefore, even when the dimples are tightly arranged in the vicinity of the parting line so as to increase the surface coverage of the dimples, a resin injection port having an opening of a specific surface area can be provided without being affected by the dimple configuration.

Also, by using the mold of the invention, even when manufacturing golf balls with a high dimple surface coverage on which the dimples are tightly arranged, particularly up to the vicinity of the resin injection port, imbalances in the resin injection pressure and flow rate during injection molding are suppressed, enabling golf balls to be manufactured without giving rise to production problems such as molding defects, scorching, or deformation and eccentricity of the core.

In addition, because golf balls molded using the inventive mold have a high dimple surface coverage and symmetry, the aerodynamic properties can be improved, enabling an excellent flight performance to be achieved and making it possible to minimize the variability of flight.

Moreover, in the mold of the invention, when equally spaced lines are drawn at 0.05 mm intervals from an inner peripheral wall toward a center axis of a gate having the non-circular resin injection port, by adjusting the cross-sectional size of the gate so that the distance between the center of a region enclosed by the innermost equally spaced line and the inner peripheral wall of the gate is less than 0.5 mm, the molten resin material within the gate area can be efficiently and thoroughly cooled after injection molding, giving a good-quality ball surface free of conspicuous gate marks. As a result, the finished ball has a good appearance and the productivity can be enhanced.

BRIEF DESCRIPTION OF THE DIAGRAMS

DETAILED DESCRIPTION OF THE INVENTION

The golf ball mold of the invention is described more fully below in conjunction with the appended diagrams.

The "parting line" and "parting plane" of the mold, as used in the description below, are defined as follows.

The "parting line" is a line that serves as a reference when the mold splits into a plurality of parts. For example, in the case of a mold that splits into two parts, the parting line refers to a line that serves as a reference for the mating of the upper mold half with the lower mold half, and is rectilinear. The "parting plane" of the mold refers to the area of contact when the respective mold parts that have been separated based on the above parting line are joined together. In the present invention, because a plurality of dimple-forming protrusions that lie across the parting line are provided on the parting plane, the parting plane has convex features due to the dimple-forming protrusions and also has concave features which correspond to the convex features. Specifically, as shown in FIGS. 1A and 1B, the parting plane 3 of the mold has convex features 3a and concave features 3b; rectilinear sections other than these convex features 3a and concave features 3b coincide with the parting line PL.

Figure 8:
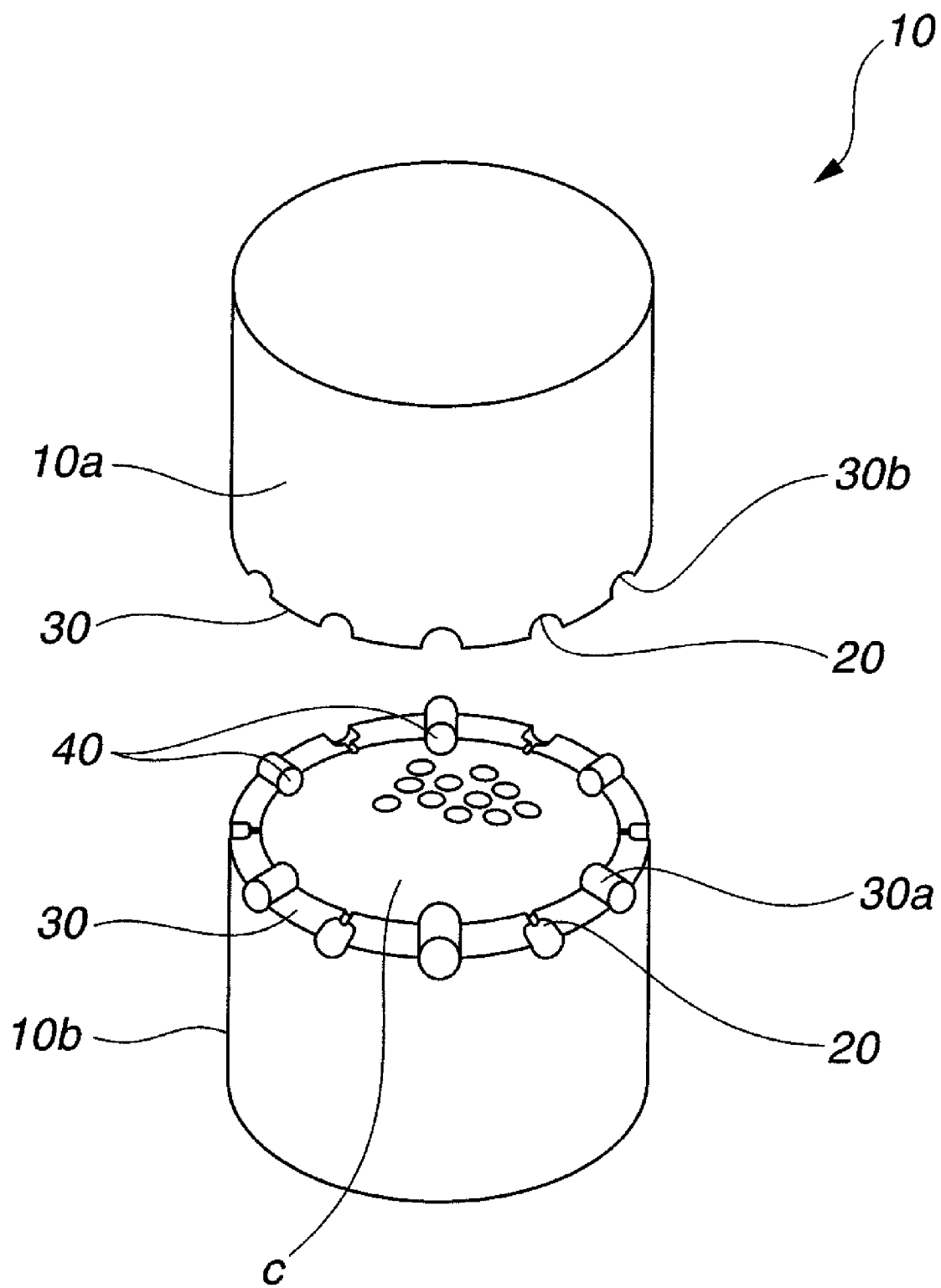
FIG. 8 is a schematic perspective view showing a conventional golf ball mold.
Figure 9:
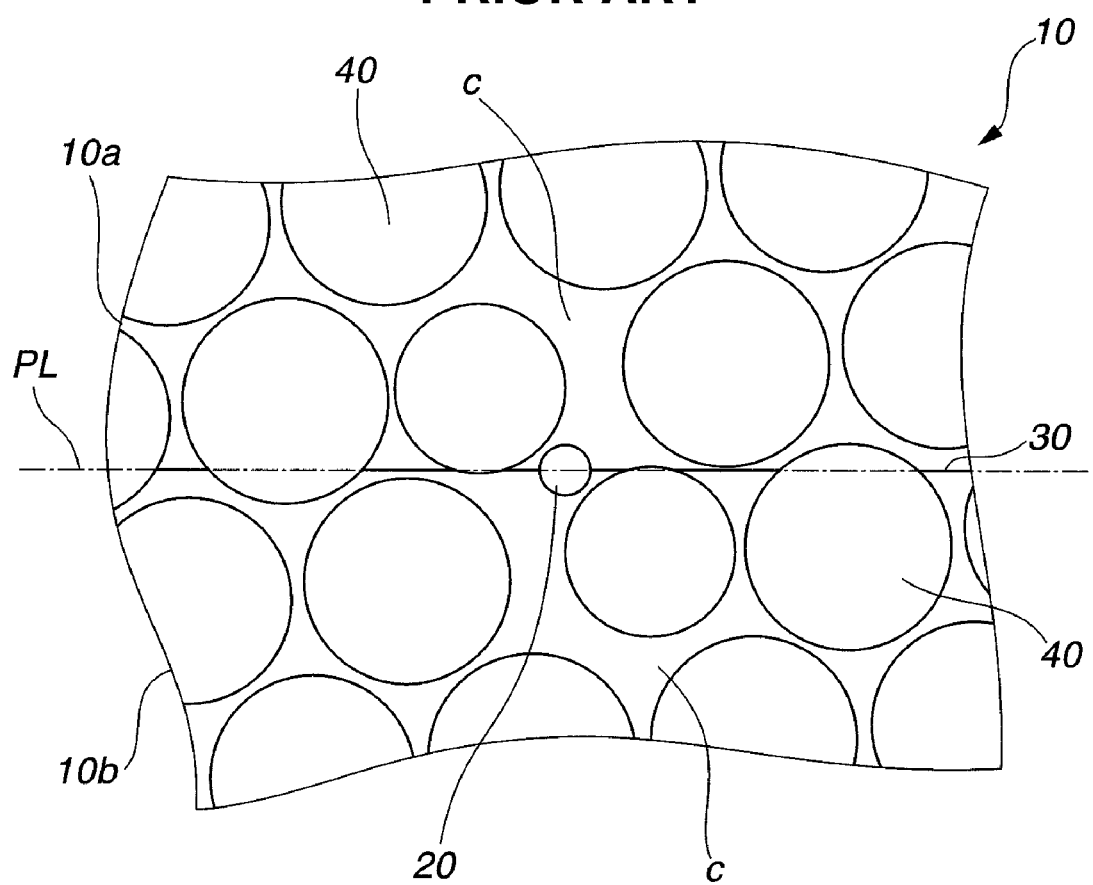
FIG. 9 is an enlarged plan view of the vicinity of a resin injection port in a conventional golf ball mold.

The golf ball mold of the invention has a plurality of mold parts which split along a parting line and removably mate to form a spherical cavity for disposing at the interior a core or a sphere composed of a plurality of layers. The number of parts into which the mold splits may be suitably set according to the mold specifications and is not subject to any particular limitation. For example, when the number of parting planes in the mold is small, as in a two-part mold having a single parting plane, mold fabrication costs and limitations in the arrangement of the dimples can be reduced. On the other hand, when a plurality of parting planes is provided and the mold is split into a larger number of parts, the mold releasability of the molded piece can be enhanced. For the sake of simplicity, the mold used in the description that follows is, as shown in FIG. 8, a two-part mold which splits along the golf ball equator as the parting line.

Figure 1A:
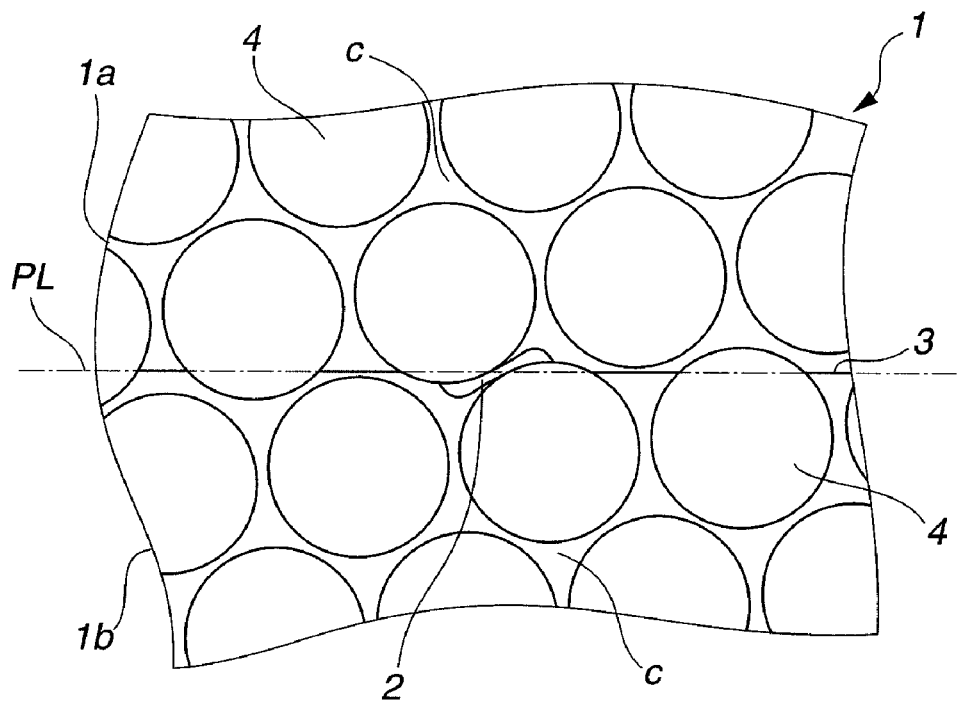
FIG. 1A is an enlarged plan view of the vicinity of an injection port in a golf ball mold according to an embodiment of the invention.
Figure 1B:
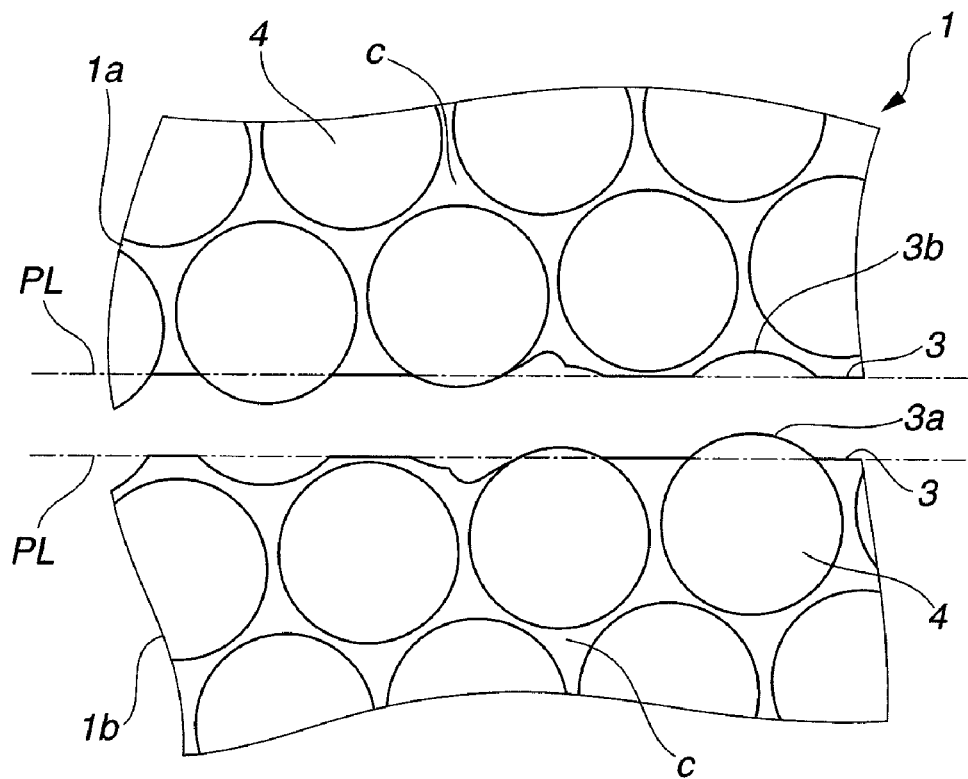
FIG. 1B is a diagram showing the same mold in a parted state.

FIG. 1A is an enlarged plan view of the vicinity of a resin injection port 2 in a golf ball mold 1 according to one embodiment of the present invention, and FIG. 1B is a view showing the same mold 1 in a state where it has been split at a parting plane 3 into an upper mold half 1a and a lower mold half 1b. The basic construction generally accords with that of the mold shown in FIG. 8. Hence, although an overall view is not shown here, this mold 1 has an upper mold half 1a and a lower mold half 1b which part along the golf ball equator as the parting line PL and removably mate to form a spherical cavity c for disposing at the interior a core or a sphere composed of a plurality of layers. A plurality of dimple-forming protrusions 4 for forming dimples of circular shape as seen from above on the surface of the golf ball are provided on the inner wall of the cavity c, in addition to which a plurality of dimple-forming protrusions 4 are provided so as to lie across the parting line PL. Moreover, a resin injection port 2 having an opening of a specific surface area is formed along the parting plane 3 of the upper and lower mold halves. Here, as shown in FIG. 1B, due to the dimple-forming protrusions 4 which lie across the parting line PL, the parting plane 3 has convex features 3a and concave features 3b which correspond to the convex features 3a.

In FIG. 1, the injection port 2 is formed so as to lie across the parting line PL between two dimple-forming protrusions 4 which lie across the parting line PL. The margin around the opening of the injection port 2 has a non-circular shape obtained by joining together with rotational symmetry the ends of two substantially S-shaped curves, with approximately one-half of each of the two curves being formed at one end in a shape that coincides with the bottom margin of one of the dimple-forming protrusions 4. Here, the center of symmetry of the two curves lies on the parting line PL. The approximate one-half of each curve at the other end traces a gradual curve which swells out into a region where dimples do not form between the adjoining dimple-forming protrusions 4 (a region corresponding to, on the surface of the molded ball, a land area where dimples do not form), and is joined to the end of the other substantially S-shaped curve. This shape is not subject to any particular limitation, and may be suitably set in accordance with, for example, the dimple configuration and the required surface area of the opening. From the standpoint of achieving a good resin flow, it is preferable to form this as a gradual curve like that shown in FIG. 1 so as to provide a shape without any rectilinear portions.

In the mold 1 of the present invention, the injection port 2 is formed at a position which is set as appropriate for the mold specifications and is not subject to any particular limitation. However, from the standpoint of the symmetry of resin flow during injection molding, the injection port 2 is preferably provided so as to intersect the parting line PL. Also, from a similar standpoint, it is more preferable for the margin around the opening of the injection port 2 to have a shape which, as shown in FIG. 1, is formed with rotational symmetry and is formed so as to have a center of symmetry that lies on the parting line PL. The number of injection ports 2 formed may also be suitably set. Although not subject to any particular limitation, the number may be set as required to from 1 to about 8.

Figure 2:
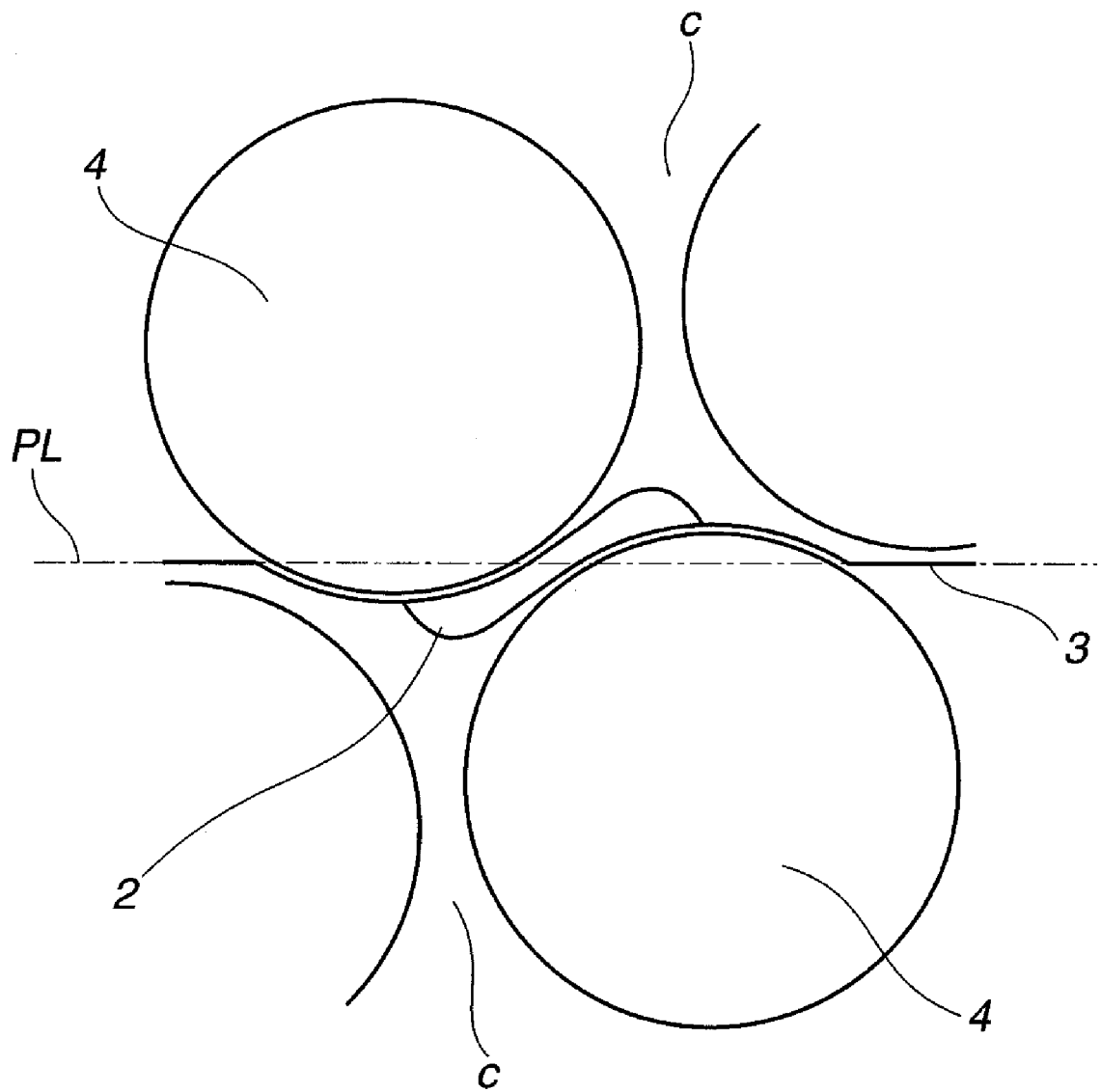
FIG. 2 is an enlarged plan view of the vicinity of an injection port in a golf ball mold according to another embodiment of the invention.
Figure 3:
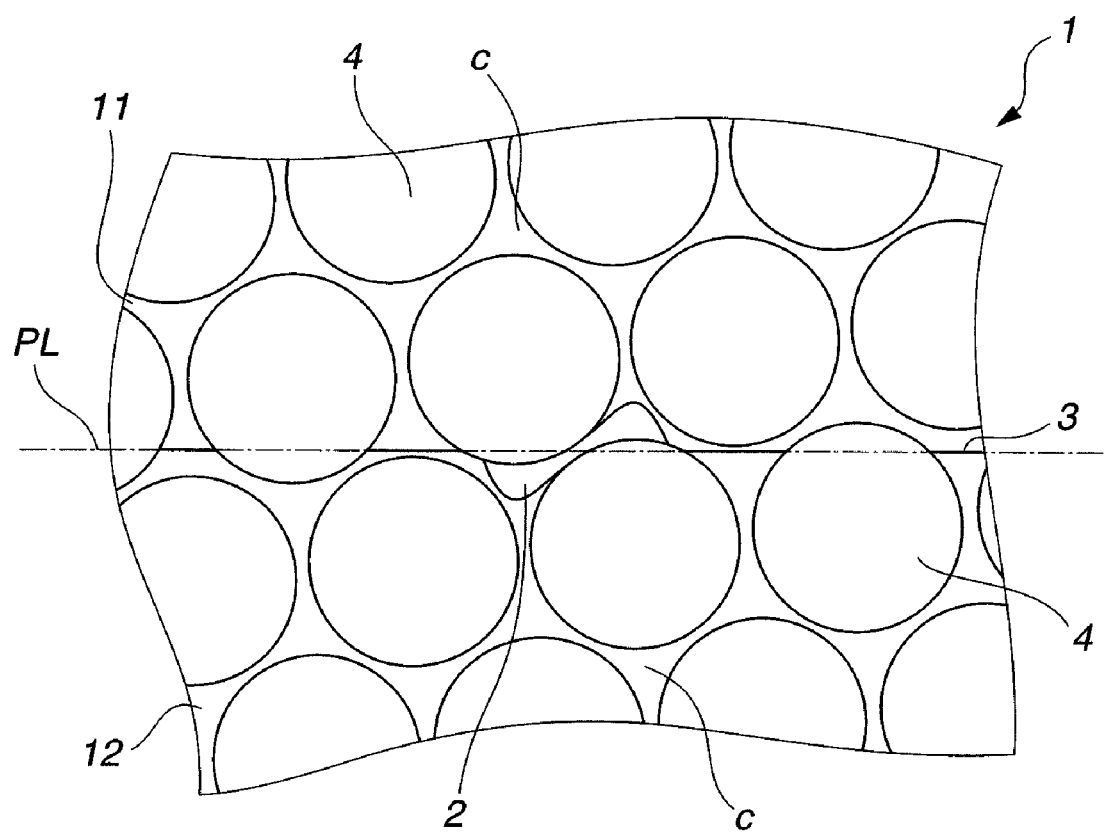
FIG. 3 is an enlarged plan view of the vicinity of an injection port in a golf ball mold according to yet another embodiment of the invention.
Figure 4:
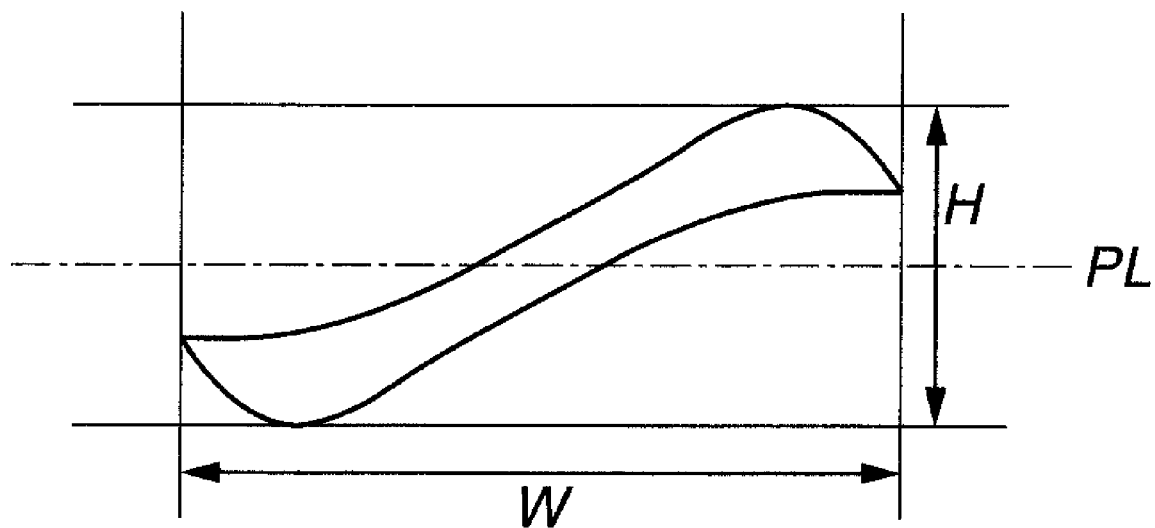
FIG. 4 is a further enlarged diagram showing the shape of the resin injection port in the mold of FIG. 1.

FIG. 1 shows an example in which a portion of the margin around the opening of the injection port 2 has a shape which coincides with the shape of a bottom margin of the dimple-forming protrusion 4. However, as shown in FIG. 2, so long as these have mutually conforming shapes, they may be separated by some interval; that is, a portion of the margin around the opening of the injection port 2 does not necessarily have to be made to coincide with the bottom margin of the dimple-forming protrusion 4. In cases where the intervals between adjoining dimple-forming protrusions 4 are small and it is necessary to secure a larger surface area for the opening of the injection port 2, the portion of the margin around the opening of the injection port 2 which conforms with the bottom margin of the dimple-forming protrusion 4 may be made to coincide with the bottom margin of the adjoining dimple-forming protrusion 4.

The interval between the dimple-forming protrusions 4 (minimum distance between dimple edges) adjoining the injection port 2 is suitably set in accordance with the dimple arrangement, and is not subject to any particular limitation. The injection port 2 which is formed in the inventive mold 1 may be suitably employed also between adjoining dimple-forming protrusions 4 separated by a very small interval. Specifically, suitable use is possible at an interval of up to about 1.2 mm, particularly up to about 1.0 mm, and most particularly up to about 0.8 mm. The lower limit in such an interval at which the injection port 2 may be formed is set in the present invention to about 0.3 mm or more, and preferably about 0.5 mm or more.

The surface area of the opening in the injection port 2 is not subject to any particular limitation and may be set as appropriate. However, from the standpoint of dispersing the resin injection pressure and suppressing deformation and eccentricity of the core, etc., the surface area of the opening for each injection port is preferably set in a range of from about 0.2 to about 2.5 mm$^2$, and more preferably from about 0.5 to about 1.1 mm$^2$. For example, by making the outwardly swelling portion of the substantially S-shaped injection port larger than in the shape shown in FIG. 1, an opening having a larger surface area can be achieved.

Also, from the standpoint of enabling trimming and buffing of the molded golf ball to be carried out more uniformly and reliably, letting the width and height of the resin injection port 2 based on the parting line PL be respectively W and H, the aspect ratio (W/H) of the injection port 2, although not subject to any particular limitation, may be set to preferably from about 1.0 to about 8.0, and more preferably from about 2.0 to about 5.0.

Although FIG. 1 shows an example in which dimple-forming projections 4 having a spherical shape as seen from above are provided, the shapes of the dimple-forming protrusions are not subject to any particular limitation; any shape that is known as a dimple shape may be employed for this purpose. In the present invention, advantageous use may be made of shapes that are free of straight lines, such as circular, oval or teardrop shapes.

The material used in the inventive mold is not subject to any particular limitation. Use may be made of a known material.

Also, in the present invention, to increase the cooling efficiency of the gate portion after injection molding and thereby enhance productivity, the cross-section of the injection gate for which the injection port serves as the opening is adjusted to a given size. The injection gate, as shown in FIG. 10, is generally a tubular body having a cross-section of the same shape as the injection port and a minor axis or major axis of a length L. The cross-sectional shape is substantially constant from the injection port 102 to an opening 103 at the other end.

Figure 10A:
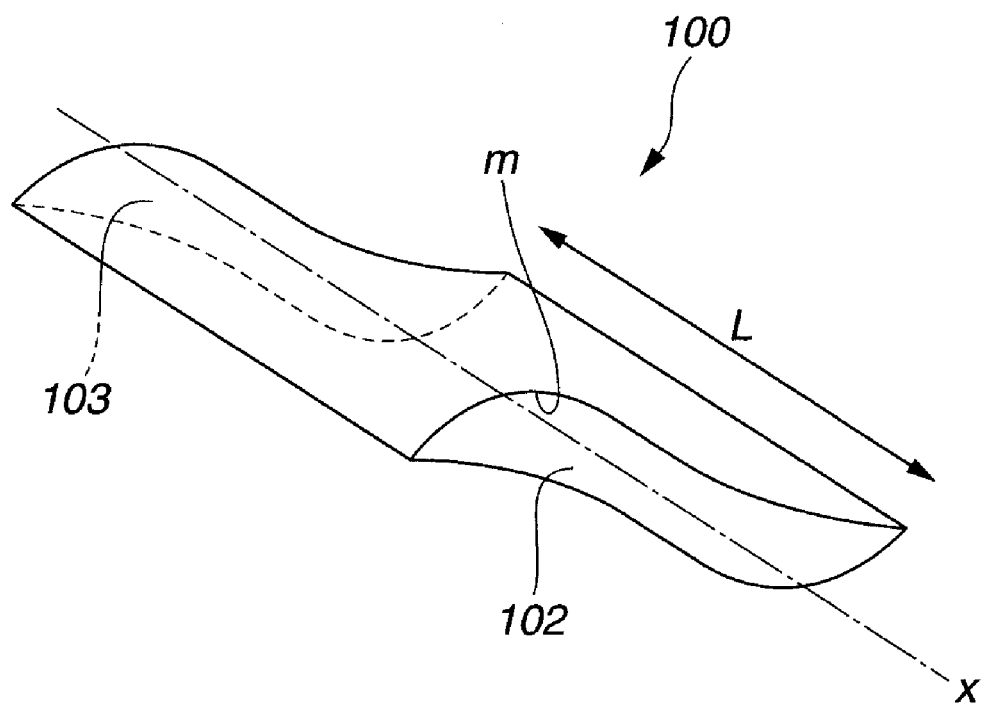
FIG. 10 shows schematic perspective views of gates having non-circular and circular resin injection ports.
Figure 10B:
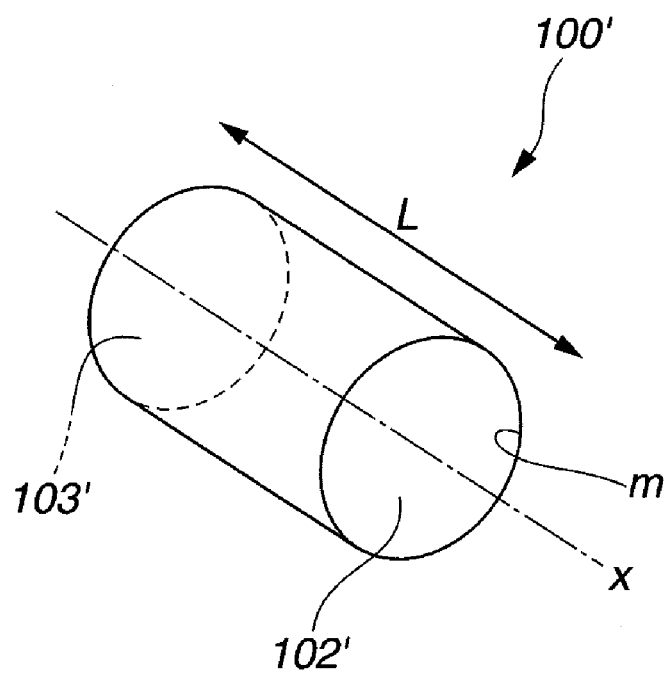
Figure 11A:
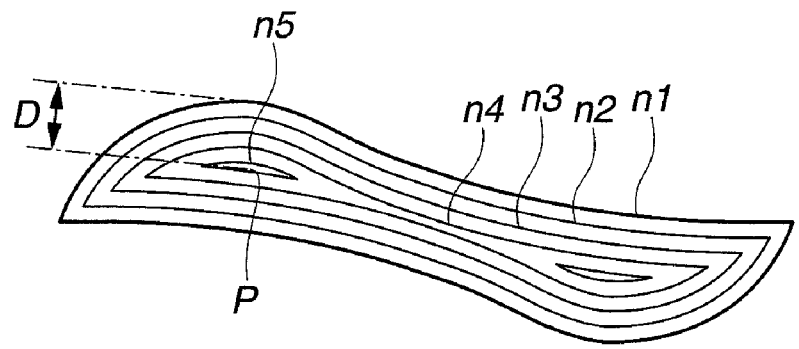
FIG. 11A is a diagram depicting the resin injection port in Example I at 0.05 mm intervals.
Figure 11B:
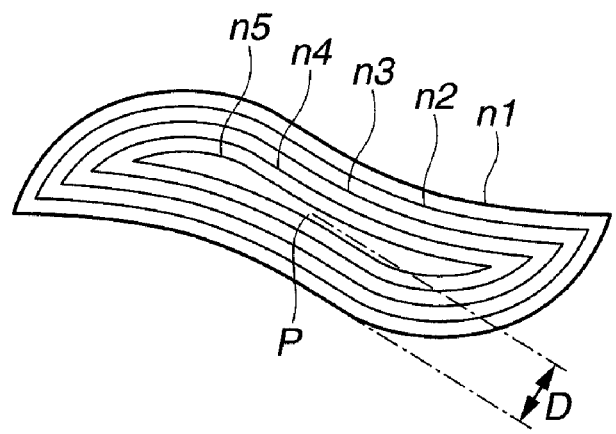
FIG. 11B is a diagram depicting the resin injection port in Example II at 0.05 mm intervals.
Figure 11C:
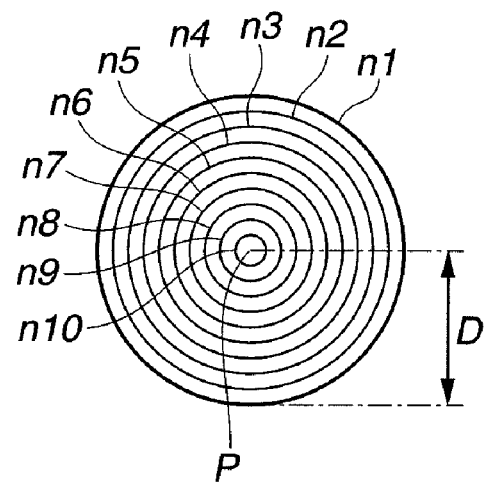
FIG. 11C is a diagram depicting the resin injection port in Example III at 0.05 mm intervals.

In this invention, when equally spaced lines are drawn at 0.05 mm intervals from an inner peripheral wall toward a center axis of the injection gate, the cross-sectional size of the gate is adjusted so that the distance between the center P of a region enclosed by the innermost equally spaced line and the inner peripheral wall of the gate is less than 0.5 mm. In other words, when N equally spaced lines are drawn at 0.05 mm intervals from the inner peripheral wall toward the center axis of the injection gate, the cross-sectional size of the gate is adjusted so that the number N of equally spaced lines is less than 10. To illustrate specifically, let us assume that equally spaced lines are drawn from the inner peripheral wall m to the center axis x of the injection gate 100 shown in FIG. 10. As shown in FIG. 11, N equally spaced lines can be drawn in order as n1, n2, n3, . . . from the inner peripheral wall m of the injection gate. Five equally spaced lines n1 to n5 can be drawn in FIG. 11A, five equally spaced lines n1 to n5 can be drawn in FIG. 11B, and ten equally spaced lines n1 to n10 can be drawn in FIG. 11C. The innermost equally spaced line in each of these examples is, respectively: n5, n5 and n10. The cross-sectional size of the gate is adjusted so that, in each case, the distance D between the center P of the region enclosed by the innermost equally spaced lines (n5, n5, n10) and the inner peripheral wall m of the gate is less than 0.5 mm. It should be noted that the distance D between the center P of the region enclosed by the innermost equally spaced line and the inner peripheral wall m of the gate corresponds to the maximum distance that the resin material moves from the inner peripheral wall to the center of the injection gate (sometimes indicated below simply as the "maximum distance D").

The smaller the maximum distance D, the higher the cooling efficiency of the injection gate. Moreover, in this invention, along with making the injection port 102 of the injection gate 100 non-circular as shown in FIG. 10A, the maximum distance D that the resin material moves from the inner peripheral wall m to the center x of the injection gate 100 can be made shorter than for a circular injection port of the same cross-sectional area (FIG. 10B). As a result, the time it takes to cool the resin material present at the interior of the injection gate 102 can be shortened, thereby enabling the resin material to be fully and efficiently cooled.

The maximum distance D is less than 0.5 mm, preferably 0.4 mm or less, and more preferably 0.3 mm or less. Above this value, cooling and solidification of the resin material within the gate is inadequate, and the productivity worsens. The lower limit value in the maximum distance D is preferably 0.05 mm or more, and more preferably 0.1 mm or more. If the maximum distance D is too much smaller than this value, the gate will end up too narrow, resulting in poor flow of the resin material.

The number N of equally spaced lines is less than 10, preferably 8 or less, and more preferably 6 or less.

As shown in FIG. 10A, making the perimeter of the injection port 102 larger increases the surface area of contact by the resin material with the inner peripheral wall m of the gate 100, thereby enhancing the cooling efficiency. Specifically, compared with the perimeter of a circle of the same cross-sectional area, as illustrated by the injection port 102' shown in FIG. 10B, it is desirable for the perimeter of the injection port 102 used to be made long, preferably at least 0.5 mm, and more preferably at least 1 mm.

The cross-sectional shape of the overall gate is not subject to any particular limitation. However, as shown in FIG. 10, it is generally preferable for the overall gate to have the same cross-section as the injection port.

The length L of the overall gate, although not subject to any particular limitation, is preferably at least 0.3 mm, more preferably at least 0.4 mm, and even more preferably at least 0.5 mm. Below this lower limit, the flow of the resin material may worsen, possibly giving rise to molding defects. The upper limit in the gate length is preferably 1.5 mm or less, more preferably 3 mm or less, and even more preferably 5 mm or less. If the gate length exceeds the upper limit, the flow of the resin material may worsen or the material discarded after injection molding may increase excessively, possibly increasing production costs.

The number of gates, although not subject to any particular limitation, is preferably set to from 1 to 8 per mold. With regard to the manner in which the gates are arranged, it is preferable for the gates to be arranged at equally spaced intervals along the parting plane (parting line) of the mold.

When a golf ball is molded using the golf ball mold of the invention, the molding method and conditions may be similar to those used with conventional molds. For example, when a core or the like is placed in the mold and injection molding is carried out, the core, etc. is generally supported with support pins. Such support pins may be configured in the same way as in the prior art. A specific method for doing so is described below. Here, although not shown in the diagrams, in cases where two-piece solid golf balls are manufactured by injection-molding the cover around a solid core using a two-part mold that splits into upper and lower mold halves, with the solid core supported by support pins at the center of the cavity, the upper and lower mold halves are removably mated and a known molding material capable of being used to mold golf ball covers, such as a known ionomeric resin, is passed through each of the resin injection ports and fed in a molten state to the interior of the cavity. After cooling and solidification, the upper and lower mold halves are separated, the molded piece is extracted and the gates are cut, following which flash is removed by trimming according to a conventional method.

The means for cooling and solidifying the molding material, although not subject to any particular limitation, is exemplified by a means which disposes cooling lines at the mold interior and carries out cooling by water cooling. That is, the entire cavity is cooled by the placement of cooling lines in the mold, and the resin material is cooled through the gates.

When a golf ball cover is formed using the inventive mold, a known thermoplastic resin may be used without particular limitation, although preferred use may be made of, for example, an ionomeric resin or a urethane resin. Also, in this invention, when a relatively soft resin material having a Shore D hardness of from 40 to 53 is used as the resin material to be injected, golf balls can be manufactured without the occurrence of molding defects.

The thickness of the cover that is formed may be suitably set according to such considerations as the construction and materials of the golf ball to be manufactured, and is not subject to any particular limitation. However, as described above, because the inventive mold disperses the resin injection pressure during injection molding and can thereby suppress deformation or eccentricity of the core, etc., the mold is particularly effective when a cover having a thickness of 1.5 mm or less that is readily subject to the influence of the injection pressure is formed. By making the cover thinner, a golf ball which fully elicits the resilience of the core and the intermediate layer can be provided.

The range in the cover thickness is preferably set to from 0.5 to 1.5 mm, more preferably from 0.6 to 1.2 mm, and even more preferably from 0.7 to 1 mm. At a cover thickness greater than the above range, it may not be possible to fully elicit the resilience of the core and the intermediate layer. On the other hand, at a cover thickness smaller than the above range, molding defects may arise.

The shape, number and arrangement of dimples formed by the dimple-forming protrusions are not subject to any particular limitation, and may be set as appropriate for the ball specifications. For example, the dimple diameter in the present invention may be set in a range of preferably from 2.5 to 6 mm, more preferably from 3 to 5.5 mm, and even more preferably from 3.5 to 5 mm. The dimple depth, which is also not subject to any particular limitation, may be set in a range of preferably from 0.1 to 0.2 mm, more preferably from 0.125 to 0.15 mm, and even more preferably from 0.135 to 0.144 mm. In particular, owing to the possibility of large changes in dimple shape in the trimming operation to remove flash that has formed during injection molding, it is preferable for dimples disposed near the resin injection ports to have the specific diameter and depth indicated above.

From the standpoint of the aerodynamic properties, the surface coverage by the dimples on the surface of the ball is set to preferably at least 70%, more preferably at least 75%, and even more preferably at least 80%. By using the mold of the invention, balls having a high surface coverage can easily be manufactured.

Figure 5:
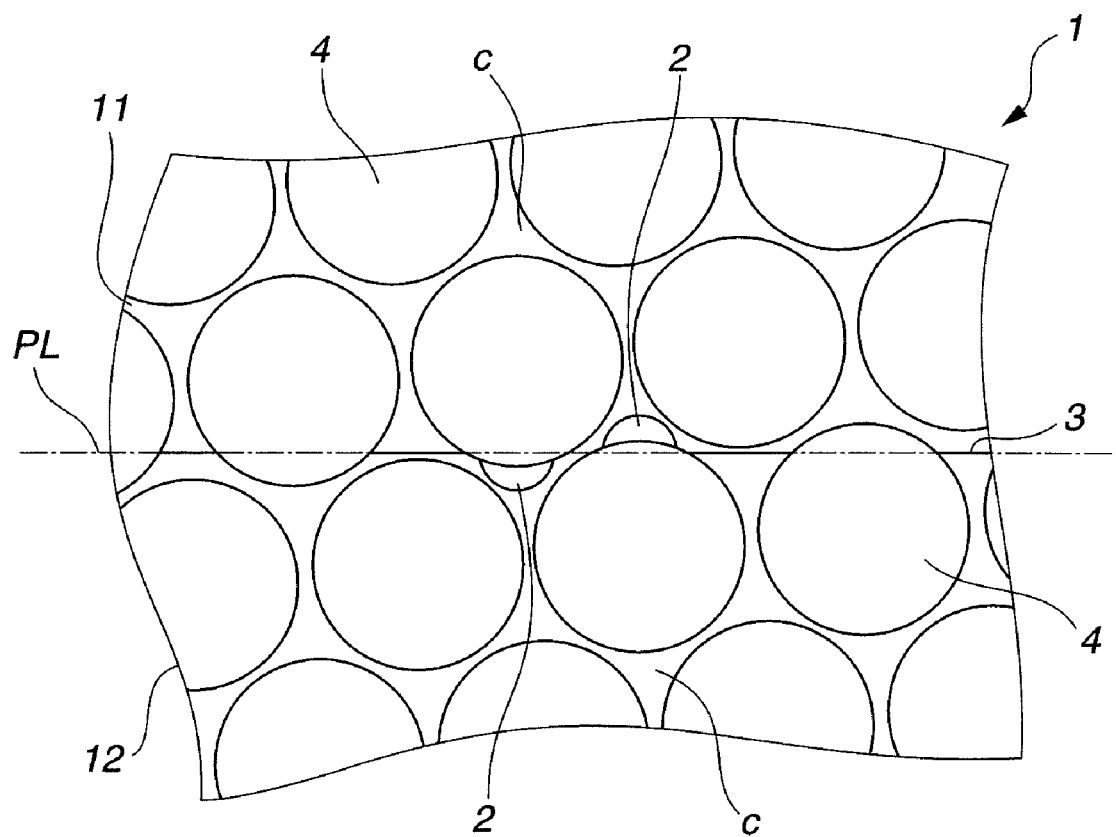
FIG. 5 is an enlarged plan view of the vicinity of injection ports in a golf ball mold according to a different embodiment of the invention.

Although preferred embodiments of the present invention have been described above in conjunction with the diagrams, the golf ball mold and golf ball of the invention are not limited by the diagrams and the above embodiments and may be suitably modified within the spirit and scope of the present invention. For example, the number of parts into which the mold splits and the shape, size and number of resin injection ports disposed in the mold are not limited by the details given in the foregoing embodiments and diagrams—suitable modification of the shapes and positions of the resin injection ports in the manner shown in FIG. 5 also being possible, and may be suitably modified and selected without departing from the spirit and scope of the invention.

Figure 6:
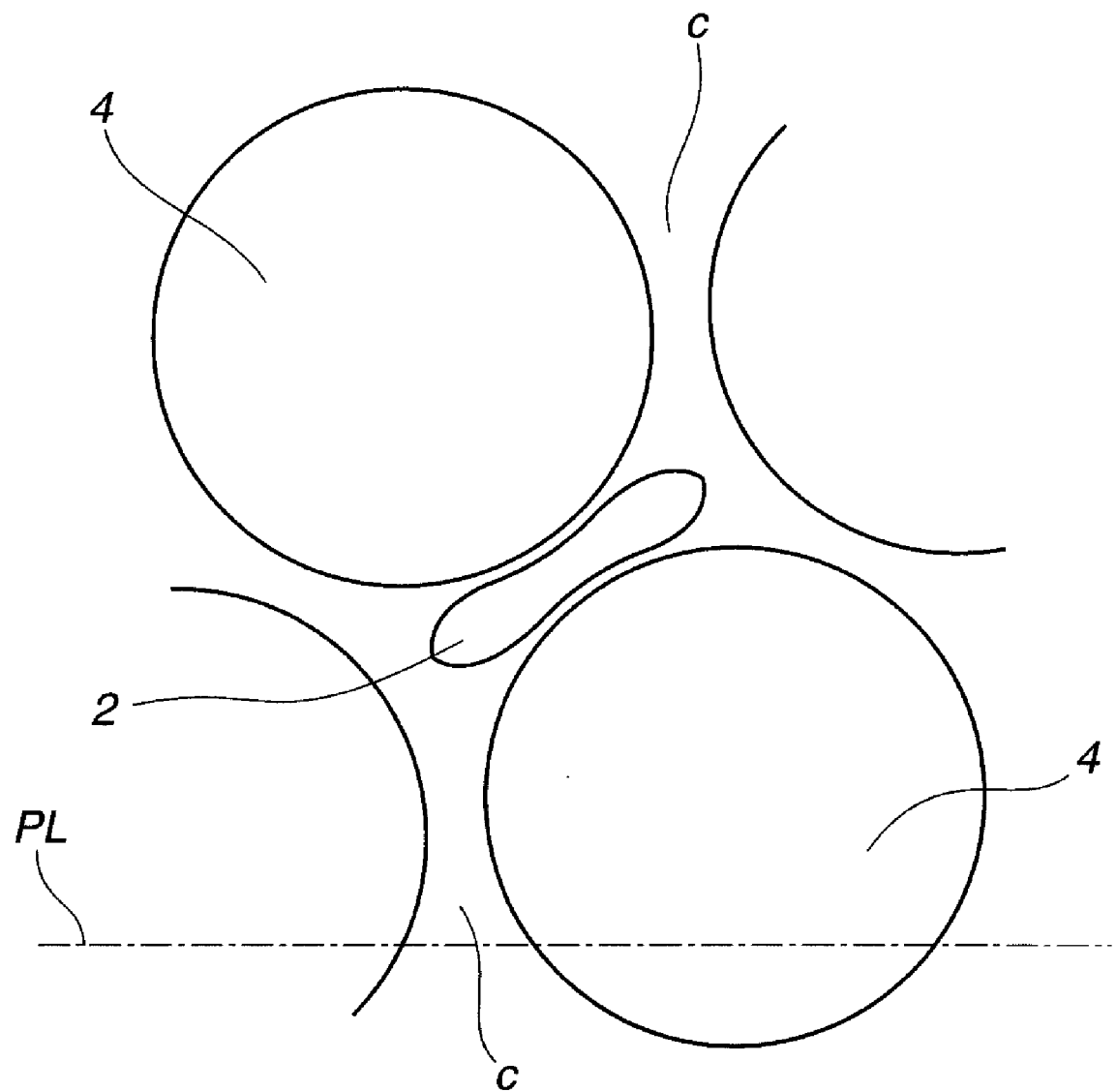
FIG. 6 is an enlarged plan view of the vicinity of an injection port in a golf ball mold according to a further embodiment of the invention.
Figure 7:
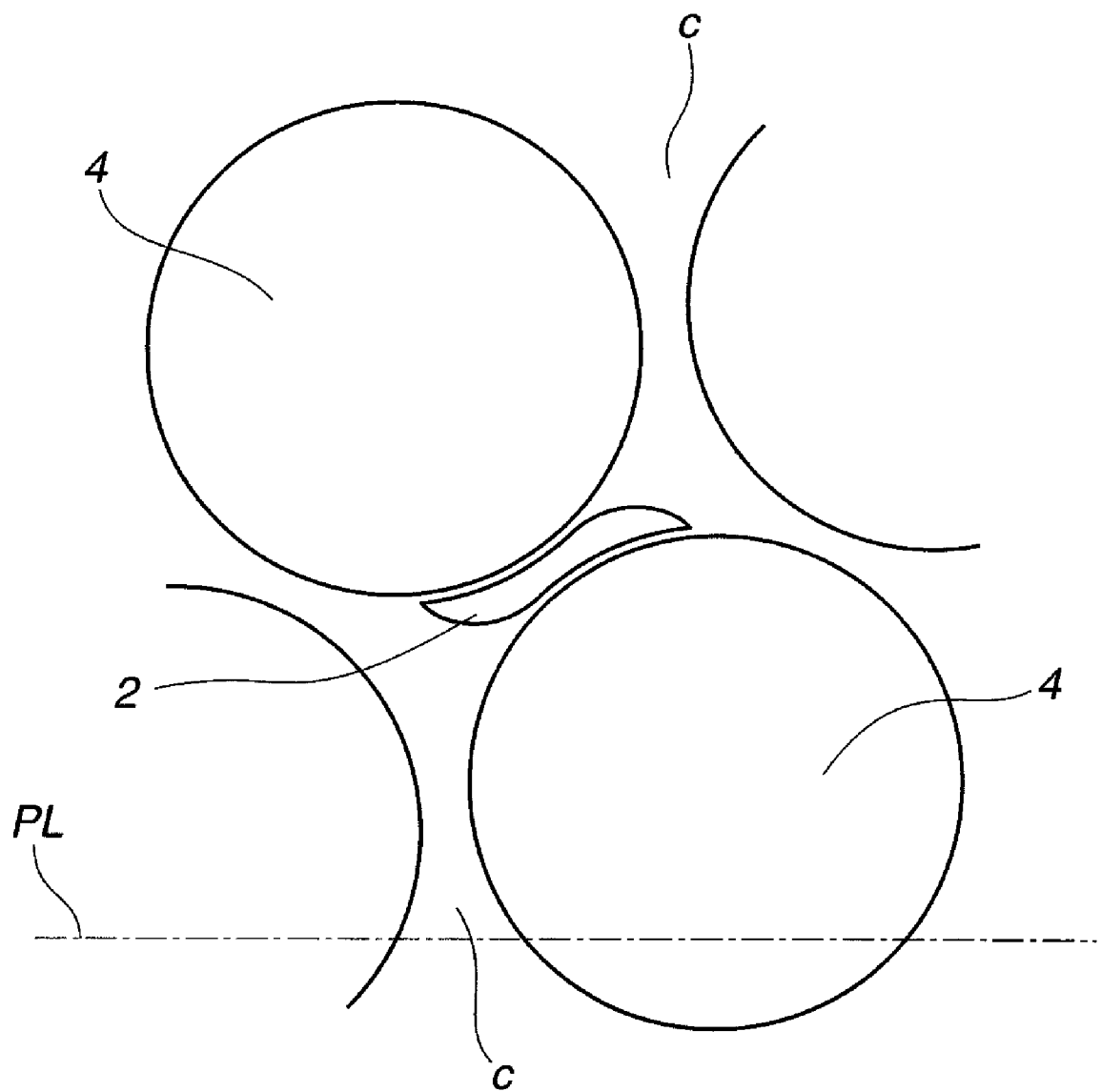
FIG. 7 is an enlarged plan view of the vicinity of an injection port in a golf ball mold according to a still further embodiment of the invention.

The positions where resin injection ports are provided do not necessarily have to be positions on the parting line or parting plane of the mold. For example, as shown in FIGS. 6 and 7, the resin injection ports may also be disposed between dimple-forming protrusions located at positions separated by a given interval from the parting line.

As explained above, the golf ball mold of the present invention enables a resin injection port having an opening of a given surface area to be formed without affecting the dimple arrangement, thus making it possible to achieve dimple arrangements that are impossible in molds provided with conventional circular resin injection ports and enabling production trouble due to imbalances in resin flow and injection pressure that has hitherto been a problem to be resolved. Moreover, because dimples can now be formed to a high density even in the vicinity of resin injection ports where the dense formation of dimples had not previously been possible, the degree of freedom in dimple design is increased even further, enabling golf balls having a very high dimple surface coverage and symmetry to be easily obtained. Therefore, golf balls manufactured using the golf ball mold of the present invention are able to achieve good aerodynamic properties even more effectively than in the prior art, enabling the balls to be imparted with an outstanding flight performance.

Also, in the golf ball mold of the present invention, when equally spaced lines are drawn at 0.05 mm intervals from an inner peripheral wall toward a center axis of a gate having a non-circular resin injection port, the cross-sectional size of the gate is adjusted so that the distance between the center of a region enclosed by the innermost equally spaced line and the inner peripheral wall of the gate is less than 0.5 mm. As a result, after injection molding, the molten resin material within the gate portion can be efficiently and fully cooled, thereby giving the finished ball a good appearance and enabling the productivity to be enhanced.

EXAMPLES

Using a cis-1,4-polybutadiene-based rubber material, cores having a diameter of 37.3 mm were fabricated for each example. Next, an inner cover layer composed primarily of an ionomeric resin was injection-molded to a thickness of 1.7 mm over the core in each example, thereby giving intermediate spheres in the respective examples. Then, in the respective examples, using the type of injection gate indicated in Table I, and using the respective molds of Examples I to III having six injection gates uniformly disposed along the parting line, a cover material composed primarily of urethane resin was injection-molded to a thickness of 1.0 mm, thereby forming an intermediate sphere in each example. As a result, a molded ball which had inner and outer cover resin layers formed on the core surface, the same arrangement of dimples, and a diameter of 42.70 mm and a weight of 45.30 g was fabricated in each example.

After injection molding, the cover resin material was water-cooled by means of cooling lines disposed at the mold interior, and the upper and lower halves of the mold were separated. The molded ball was removed, subjected to gate cutting and trimming, and painted, thereby giving a finished ball in the respective examples.

TABLE I

| | Type of gate used | Gate cross-sectional surface area (mm²) | Gate perimeter (mm) | Gate surface area (mm²) | Maximum distance*² (number N of equally spaced lines) |
|---|---|---|---|---|---|
| Example I | Gate I (FIG. 11A) | 0.79 | 5.00 | 5.40 | 0.21 (N = 5) |
| Example II | Gate II (FIG. 11B) | 0.79 | 4.37 | 4.54 | 0.25 (N = 5) |
| Example III | Gate III*¹ (FIG. 11C) | 0.79 | 3.14 | 3.14 | 0.50 (N = 10) |

*¹Cross-sectional shape of Gate III was a circle of 1.0 mm diameter.
*²The "maximum distance" refers to the maximum distance the resin material moves from the inner peripheral wall to the center of the injection gate.

Evaluation of Golf Ball Appearance

Upon visually examining the properties of the gate injection port marks remaining on the surface of the ball in the respective examples, the gate marks on the surface of the ball surface that was injection-molded using Gate I had a very small degree of swelling, giving a good ball surface. A little swelling was observable at the gate marks on the surface of the ball obtained using Gate II, but this was completely inconspicuous, resulting in a product that was not defective. On the other hand, on the surface of the ball obtained using Gate III which had a circular cross-sectional shape of 10 mm diameter, the gate marks were swollen in such a way as to enter into the dimple recesses, giving a defective appearance.

The invention claimed is:

1. A golf ball mold comprising a plurality of mold parts which removably mate to form a cavity having an inner wall with a plurality of dimple-forming protrusions thereon, wherein a non-circular resin injection port for injecting into the cavity a resin material is formed between a plurality of mutually adjoining dimple-forming protrusions which include a plurality of dimple-forming protrusions that lie across a parting line of the mold and, when equally spaced lines are drawn at 0.05 mm intervals from an inner peripheral wall toward a center axis of a gate having the resin injection port, the cross-sectional size of the gate is adjusted so that the distance between the center of a region enclosed by the innermost equally spaced line and the inner peripheral wall of the gate is less than 0.5 mm, wherein the non-circular resin injection port has no rectilinear portions.

2. The golf ball mold of claim 1, wherein the non-circular resin injection port is provided so as to intersect the parting line.

3. The golf ball mold of claim 1, wherein the non-circular resin injection port has an opening with a surface area of from about 0.2 to about 2.5 mm².

4. The golf ball mold of claim 1, wherein the resin injection port has a shape which is formed with rotational symmetry and which has a center of symmetry that lies on the parting line.

5. The golf ball mold of claim 1, wherein the resin injection port has an aspect ratio (width/height) of from about 1.0 to about 8.0.

6. The golf ball mold of claim 1, wherein the dimple-forming protrusions have shapes that are free of straight lines.

7. The golf ball mold of claim 1, wherein the resin material that is injected has a Shore D hardness of from 40 to 53.

8. A method of manufacturing golf balls, comprising the steps of molding a golf ball using the golf ball mold of claim 1, then trimming flash that has formed on a surface of the golf ball.

9. The golf ball mold of claim 1, wherein the non-circular resin injection port has a substantially S-shaped portion.

10. The golf ball mold of claim 1, wherein the non-circular resin injection port has a non-circular shape obtained by joining together with rotational symmetry the ends of two substantially S-shaped curves.

* * * * *